United States Patent
Kapoor et al.

(10) Patent No.: US 10,185,692 B2
(45) Date of Patent: Jan. 22, 2019

(54) MONITORING USE OF SPECIALIZED HARDWARE COMPONENTS (SHC) OF PROCESSORS IN HETEROGENEOUS ENVIRONMENTS BY STORING EVENT COUNTS DURING EXECUTION

(71) Applicant: International Business Machines Corporation, Armonk, NY (US)

(72) Inventors: Shakti Kapoor, Austin, TX (US); Grace Y. Liu, Euless, TX (US); Karen E. Yokum, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 220 days.

(21) Appl. No.: 15/242,922

(22) Filed: Aug. 22, 2016

(65) Prior Publication Data

US 2018/0052795 A1     Feb. 22, 2018

(51) Int. Cl.
| | |
|---|---|
| *G06F 13/00* | (2006.01) |
| *G06F 13/40* | (2006.01) |
| *G06F 13/42* | (2006.01) |
| *G06F 9/38* | (2018.01) |

(Continued)

(52) U.S. Cl.
CPC ........ *G06F 13/4068* (2013.01); *G06F 9/3004* (2013.01); *G06F 9/3885* (2013.01); *G06F 12/02* (2013.01); *G06F 13/4282* (2013.01); *G06F 2212/1016* (2013.01); *G06F 2213/0026* (2013.01)

(58) Field of Classification Search
CPC .................................................. G06F 13/4068
See application file for complete search history.

(56) References Cited

U.S. PATENT DOCUMENTS

| | | | |
|---|---|---|---|
| 7,895,382 B2 | 2/2011 | Dewitt, Jr. et al. | |
| 9,077,928 B2 | 7/2015 | Milano et al. | |
| 9,971,603 B2 * | 5/2018 | Yasin ................... | G06F 9/3857 |

(Continued)

OTHER PUBLICATIONS

Cahill et al. "IBM Power Systems built with the POWER8 architecture and processors." IBM Journal of Research and Development vol. 59, No. 1, Jan./Feb. 2015, 10 pp.

(Continued)

*Primary Examiner* — Tammara R Peyton
(74) *Attorney, Agent, or Firm* — Toler Law Group, PC (57) ABSTRACT

An apparatus and a method are disclosed for tracking use of a specialized hardware component in symmetric multiprocessing computing device. A device includes a memory and one or more multi-core processors attached to a coherent memory bus. A proxy for a specialized hardware component (SHC) such as an accelerator, FPGA, or ASIC is placed in communication with the coherent memory bus. The proxy may be attached to another bus such as a peripheral component interconnect express (PCIe) bus. A tracker updates an allocated counting register with counts of events related to use of the SHC. When requested, information from the counting register is provided such as to an external device or client communicating with the multiprocessing computing device. The tracker may follow calls or messages to the SHC. The tracker may accumulate a count of message size or mode of use or use of certain functions of the SHC.

20 Claims, 5 Drawing Sheets (51) Int. Cl.
 *G06F 9/30* (2018.01)
 *G06F 12/02* (2006.01)

(56) References Cited

U.S. PATENT DOCUMENTS

| | | |
|---|---|---|
| 2002/0083003 A1 | 6/2002 | Halliday et al. |
| 2010/0122284 A1* | 5/2010 | Yoon ................ H04N 5/4401 |
| | | 725/33 |
| 2011/0161639 A1* | 6/2011 | Knauth ............... G06F 9/3863 |
| | | 712/228 |
| 2015/0186269 A1 | 7/2015 | Liao |
| 2016/0048417 A1 | 2/2016 | Gschwind et al. |
| 2016/0179672 A1 | 6/2016 | Dell et al. |

OTHER PUBLICATIONS

Mericas et al. "IBM POWER8 performance features and evaluation." IBM Journal of Research and Development, vol. 59, No. 1, Jan./Feb. 2015, 10 pp.

Schafer, "[PATCH 00/16] perf: add support for parameterized events from sysfs (PowerPC 24x7)", lkml.org, 2014, 2 pp.

Stuecheli et al. "CAPI: A Coherent Accelerator Processor Interface." IBM Journal of Research and Development, vol. 59, No. 1, Jan./Feb. 2015, 7 pp.

\* cited by examiner

MONITORING USE OF SPECIALIZED HARDWARE COMPONENTS (SHC) OF PROCESSORS IN HETEROGENEOUS ENVIRONMENTS BY STORING EVENT COUNTS DURING EXECUTION

I. FIELD OF THE DISCLOSURE

The present application relates to performance monitoring counters of processors, especially counters for heterogeneous computing environments that include various hardware components within a single computer system.

II. RELATED ART

Software applications are becoming more complex and computationally demanding. General purpose central processing units (CPUs) are built to execute sequentially defined instructions. However, CPUs are often a bottleneck in terms of system performance for applications.

One solution for improved performance is to use heterogeneous computing. As such, a specialized hardware component or an application-specific hardware component is attached to a general purpose CPU via a system bus. Specialized hardware can include graphics processing units (GPUs), field programmable gate arrays (FPGAs) and application specific integrated circuits (ASICs). Specialized hardware improves overall performance of computational tasks. Memory and memory resources can be shared between the specialized hardware and the CPUs of the general purpose hardware.

Interfaces have been developed to allow for connecting specialized hardware with general purpose CPUs. In systems, the communication between general purpose CPUs and specialized hardware, such as external accelerators, may require the use of I/O-based software stacks and other types of software or hardware interfaces. Interfaces between components have limitations. One of these limitations is the lack of tracking of the use of the specialized hardware attached to general purpose components and general purpose CPUs. It is often difficult to determine which components of a heterogeneous computing system are used during operation of a software application.

III. SUMMARY OF THE DISCLOSURE

In a first aspect of the disclosure, an apparatus includes a central processing component (CPC) having at least one core for computing. The apparatus also includes a coherent memory bus in communication with the CPC, a memory and a communication bus such as a peripheral component interconnect express (PCIe) compliant bus. A specialized hardware component (SHC) may be placed in communication with the communication bus. For example an SHC may be physically placed into a PCIe slot inside the chassis of a 2 U- or 4 U-sized server. An SHC tracker is placed in communication with the coherent memory bus, and the SHC tracker may be programmed with instructions to allocate a counting register for storing a count of events of the SHC (e.g., computing messages sent to the SHC), detect an event related to the SHC, and update the counting register with a count related to the event of the SHC. When requested by another apparatus, the SHC tracker provides counts from the counting register.

In a second aspect of the disclosure, a method is presented for tracking use of a specialized hardware component in symmetric multiprocessing computing device. The method includes attaching a memory, multi-core processors and a proxy to a coherent memory bus. The method also includes attaching a peripheral component interconnect express (PCIe) bus to the proxy and attaching a specialized hardware component (SHC) to the PCIe bus. The method further includes allocating in the memory a counting register for storing a count of events of the SHC, detecting an event of use of the SHC, and updating the counting register with a count related to the event of use of the SHC. The method includes listening for a request for information from the counting register, and providing information from the counting register when requested.

In a third aspect of the disclosure, a computer-readable storage device includes instructions to cause a symmetric multiprocessing computing device to perform various actions such as allocate a counting register for storing a count of calls or messages to a SHC attached to a communication bus. An example of a communication bus is a peripheral component interconnect express (PCIe) compliant bus. The communication bus may be connected to the symmetric multiprocessing computing device. The instructions may cause the device to listen for a request for information from the counting register. When requested, information about the use of the SHC is provided.

Features and other benefits that characterize embodiments are set forth in the claims annexed hereto and forming a further part hereof. However, for a better understanding of the embodiments, and of the advantages and objectives attained through their use, reference should be made to the drawings and to the accompanying descriptive matter.

V. DETAILED DESCRIPTION

The present disclosure relates to tracking use of a particular component or function operating in a hardware computing system. Computing components from various vendors and manufacturers are often purchased separately and assembled into a heterogeneous computing device. To address the inefficiencies associated with heterogeneous components connected to one another, and to address the needs of emerging big data workloads, complex interfaces have been developed for computers having a set of symmetric multiprocessors.

Even though these interfaces are sophisticated, the interfaces may lack certain functionalities. One shortcoming may be the lack of auditing, monitoring and reporting of components that are operating in a particular computer. Complex machines often operate in a location remote from human personnel for a variety of reasons such as physical security for expensive equipment, inhospitable environmental conditions, and wide distribution of users relative to the computing equipment. Sending a person to physically audit which components are installed together in a particular machine may not be feasible.

Figure 1:
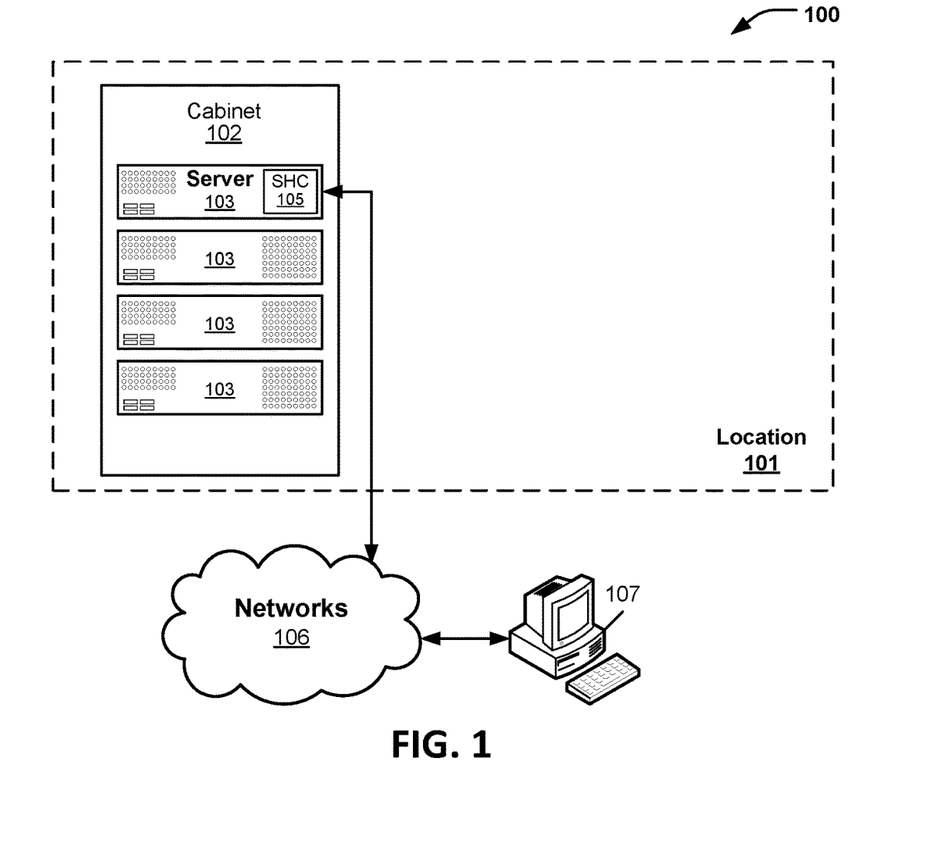
FIG. 1 illustrates a computing environment for a device such as a symmetric multiprocessing computing device.

FIG. 1 illustrates a computing environment 100 for a heterogeneous computing device 103 such as a symmetric multiprocessing computing device. Generally, a device or server 103 is assembled and mounted in a cabinet 102. The cabinet 102 may be placed in a desired, dedicated location 101 such as in a particular location within a data center. The server 103 may include a specialized hardware component (SHC) 105. The SHC 105 may interoperate with other device components of the device 103 in which it is physically installed. The SHC 105 also may interoperate with other devices such as the other devices 103 installed in the cabinet 102.

The SHC 105 may be a computing accelerator e.g., a computing device made for a specific purpose such as a graphics processing unit (GPU), a field programmable gate array (FPGA), an application specific integrated circuit (ASIC), or other type of specialty hardware component.

The device 103 may not be physically accessible by anyone other than a system administrator. Instead, the device 103 may be accessible via a remote communication through one or more networks 106. One or more personal computers 107 may remotely access the device 103 from time to time. Data may be transferred to and from the device 103 from the personal computer 107 or from another device or source. Data may take the form of logs, memory dumps and other auditing type of information.

In FIG. 1 the device 103 may provide an interface for an off-chip SHC 105 to be placed in communication with other components. The SHCs 105, placed in coherent connection with the memory of the device 103, may participate in a system-level memory coherence protocol as a peer of other memory caches in the device 103. The device 103 shares with the SHC 105 use of memory addresses for computer programs and functions of the SHCs 105. Applications operating on the SHC may lock structures in the memory of the device 103. The SHC 105 may reference and operate on data structures in a same or similar manner as applications running on the cores of the general purpose components.

Figure 2:
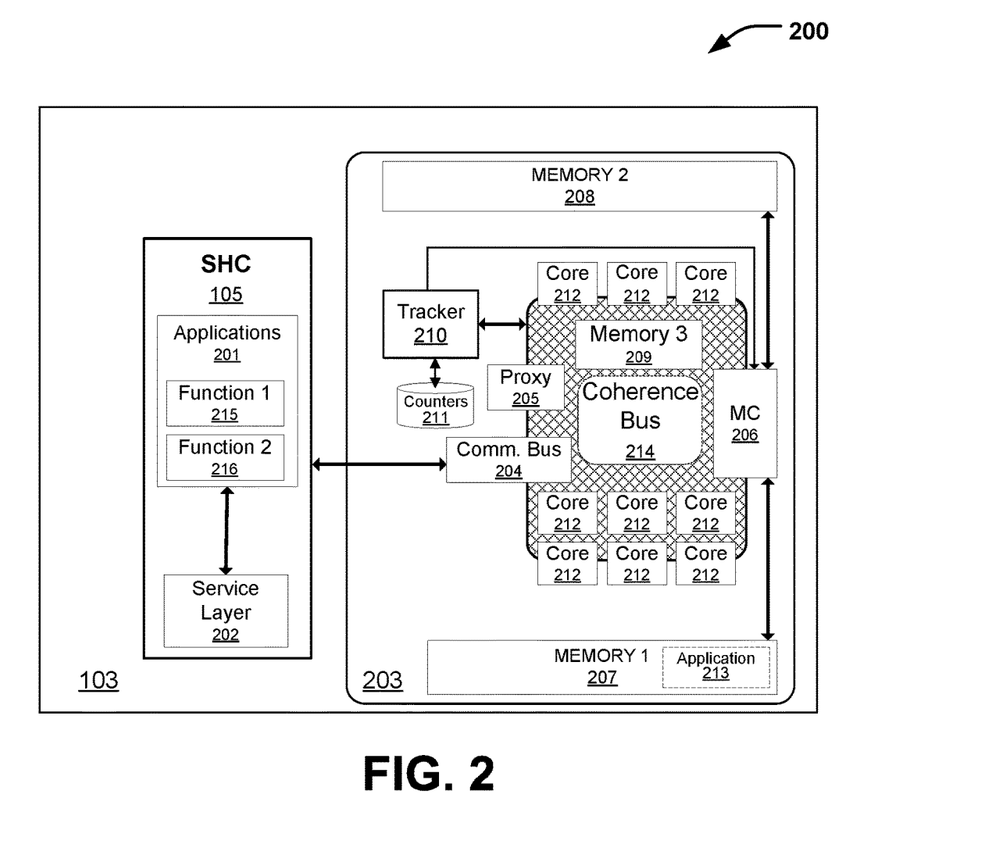
FIG. 2 is a diagram of various components of the device or server shown in FIG. 1.

FIG. 2 is a diagram 200 of various components of the heterogeneous computing device 103 shown in FIG. 1. FIG. 2 illustrates the SHC 105 relative to other components including general processing components.

In FIG. 2, the SHC 105 includes one or more applications 201 and optionally a service layer 202. The service layer 202 assists the applications 201 to interface with the general purpose processing block 203. Although not illustrated, the SHC 105 may include pins that are inserted into a socket of a communication bus 204 in communication with the processing block 203. While a single bus 204 is shown, the device 103 may provide a plurality of buses and a plurality of types of buses that directly interface with the coherence bus 214.

The processing block 203 may include one or more printed circuit boards (PCBs) that integrate electronic components such as processors and memories. In FIG. 2, processors are illustrated as cores 212. Cores 212 perform calculations for an application 213 executing in a memory such as a first memory 207, a second memory 208 or a third memory 209. These memories may be the same type of memory as each other, or may be distinctly different types of memory. The first memory 207 and the second memory 208 are accessed and operated through a memory controller 206. The third memory 209 may be integrated with the coherence bus 214 and may or may not require interaction with the memory controller 206. The memory controller 206 and memories 207, 208, 209 may communicate with the cores 212 and other components through a coherence bus 214.

According to one example, the SHC 105 communicates with components of the general purpose processing block 203 through the communication bus 204. The communication bus 204 is integrated or connected with the coherence bus 214. An example of a communication bus 204 is a PCI host bridge (PHB) such as a peripheral component interconnect express (PCIe) v.3.0 compliant bus. A specialized application 201 may include a custom software program, a custom circuit or combination of software and hardware circuitry for performing specialized calculations. A specialized application 201 may include or provide one or more functions such as a first function 215 and a second function 216.

The SHC 105 is an accelerator for the application 213 operating in the general purpose processing block 203. A software application 213 programmed in a first memory 207 may outsource some of its calculations to the SHC 105 that could be performed by general purpose cores 212. The general purpose processing block 203 may include a proxy 205 for the SHC 105. The proxy 205 may communicate with the communication bus 204. The proxy 205 may be programmed to assist in managing data transfers to and from various memories 207-209 and to assist in allowing the applications 201 to operate directly on values in memory registers of the memories 207-209 connected to the coherence bus 214.

In FIG. 2, the general purpose block 203 includes a tracker 210. According to one implementation, the tracker 210 is programmed into the third memory 209. While a single tracker 210 is illustrated in FIG. 2, multiple trackers may be implemented. Alternatively, the tracker 210 may be implemented as a tracking unit that is made available to applications 201 operating on the SHC 105 and to the applications such as application 213 operating in the first memory 207. A number of trackers 210 may be invoked for and correspond to a number of threads operating in the processing block 203 for the application 213. Alternatively, a number of trackers 210 may be invoked for and correspond to a number of threads operating for the one or more applications 201 of the SHC 105. In another example, the number of trackers 210 may be selected on some other basis.

The tracker 210 may be programmed or wired into the system 103. The tracker 210 may serve as a performance monitor or performance monitoring unit. The tracker 210 may monitor memory registers for processing events occurring in the memories 207-209 or in another component with respect to operation of the application 213 or one or more applications 201. An event may include receipt of a message sent to the proxy 205 or received by the proxy 205. The proxy 205 may communicate with the application 213 and with the applications 201. A message is related to operation of the one or more applications 201 operating in the SHC 105 or operation of the application 213 in the memory 207. The message may include a message size or a message size may be calculated by the tracker 210 based on the contents of the message. One or more counters 211 may be made available to the tracker 210. The counters may take a variety of forms such as a memory register or set of memory registers. Based on an event, the tracker 210 may update one or more counters 211.

The contents of the counters 211 may be available to various threads, agents and components of the general purpose processing block 203. Alternatively, the counters 211 may be restricted such that only an authorized program, component or thread operating in the general purpose processing block 203 has access to the one or more counters 211. The tracker 210 may provide access to its counters 211 by interacting with threads or agents making calls through the memory controller 206. According to another example, an application such as application 213 operating in the general purpose processing block 203 may read the counters 211 and provides on demand information about operation of the SHC 105. Alternatively, the tracker 210 may interact with an application that requests information accumulated by the tracker 210.

The SHC 105 may be programmed to operate according to one of a plurality of modes. One of the modes may be based on the type of communication bus 204 to which the SHC 105 is coupled. Another of the modes may be related to a function operative on the coherence bus 214 and available to any application 201 or any application 213. The tracker 210 may be programmed to track which mode the SHC 105 is operating in at any particular time. One of the modes may be related to a service available in the service layer 202 operative on the SHC 105. The tracker 210 may use a counter 211 to count a number of times an application 213 or an application 201 takes advantage of the particular mode of operation of the SHC 105.

The application 201 operating on the SHC 105 may invoke a first function 215 or a second function 216. Alternatively, the application 213 may invoke the first function 215 or the second function 216. The tracker 210 may be programmed to track which function 215, 216 of the SHC 105 is called and by which application 201, 213. The tracker 210 may use a counter 211 to count a number of times a first function 215 or a second function 216 is called. The tracker 210 may do so in addition to keeping track of other counts such as mode of operation of the SHC 105, number of cores 212 used for particular functions, how many clock cycles are used to complete a function call, how long a particular function took to complete, and so forth.

The tracker 210 may be programmed to only update a counter 211 when a particular threshold is met. For example, if a thread of the application 213 makes a minimum numbers of calls to the first function 215 of the application 201, the tracker 210 updates a respective counter 211 that increases a count of use of the first function 215 operating in the application 201 on the particular 105 in the particular communication bus 204.

The tracker 210 may be programmed to snoop on transactions operating on the cores 212. The tracker may dump a transaction meeting a particular signature or event code into one or more memory registers. Further, the tracker 210 may be programmed to aggregate dumped transactions into a log file. The tracker 210 may be programmed to send the log file to persistent storage (e.g., to a solid state drive (SSD), to a harddrive (HD)) for later availability and analysis.

Figure 3:
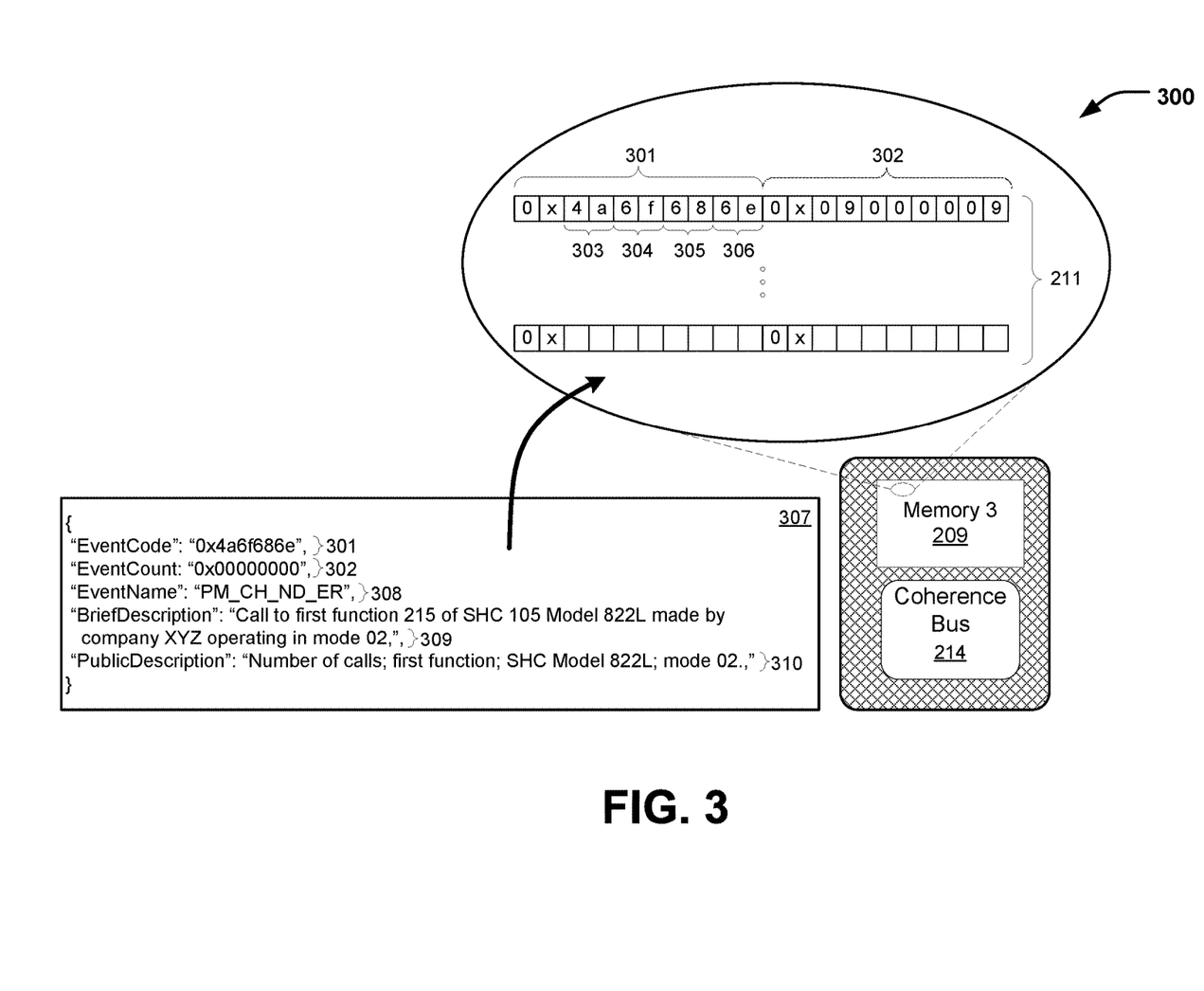
FIG. 3 illustrates data structures that provide counters for tracking use of a component of a device shown in FIG. 2.

FIG. 3 illustrates data structures 300 that provide counters for tracking use of a component of a device shown in FIG. 2. The data structures 300 may be created in a third memory 209 first shown in FIG. 2. The memory in which the data structures are implemented may be coherently in communication with the coherence bus 214. The data structures 300 include counters 211 for use by the tracker 210. According to one implementation, a counter 211 includes at least a numeric event code 301 and a numeric counter 302. The tracker 210 matches information from a memory register associated with a thread operating in the memory with the event code 301. If there is a hit, the tracker 210 updates or increments the numeric counter 302.

The event code 301 may be subdivided into one or more digits or bits that each code for a different piece of information associated with the counter 211. For example, an event code 301 may be subdivided into four subparts 303-306. A first subpart 303 may code for a model of the SHC 105. A second subpart 304 may code for a bus number such as a number or identifier corresponding to the communication bus 204. For example, the second subpart 304 may code for use of a PCIe bus. A third subpart 305 may code for an application such as application 201 or application 213. A fourth subpart 306 may code for a function of the SHC 105 such as the first function 215 or the second function 216. While four subparts 303-306 are illustrated for the event code 301, other numbers of subparts may be implemented as part of an event code. Likewise, while a subpart 303-306 is illustrated in a two-digit hexadecimal format, other formats are possible.

FIG. 3 also illustrates pseudo code 307 to implement a counter 211 such as fields or memory registers for the counter 211. For example, a counter 211 may include an event code 301 ("EventCode"), an event count 302 ("EventCount") for recording a count of an event matching the event code 301, an event name 308 ("EventName"), a brief description 309 ("BriefDescription"), and a public description 310 ("PublicDescription"). Each of the fields of the counter 211 may be publicly accessible by any process, agent or thread, or may be private and only accessible to authorized programs, threads or agents operating on the SHC 105 or the processing block 203.

Figure 4:
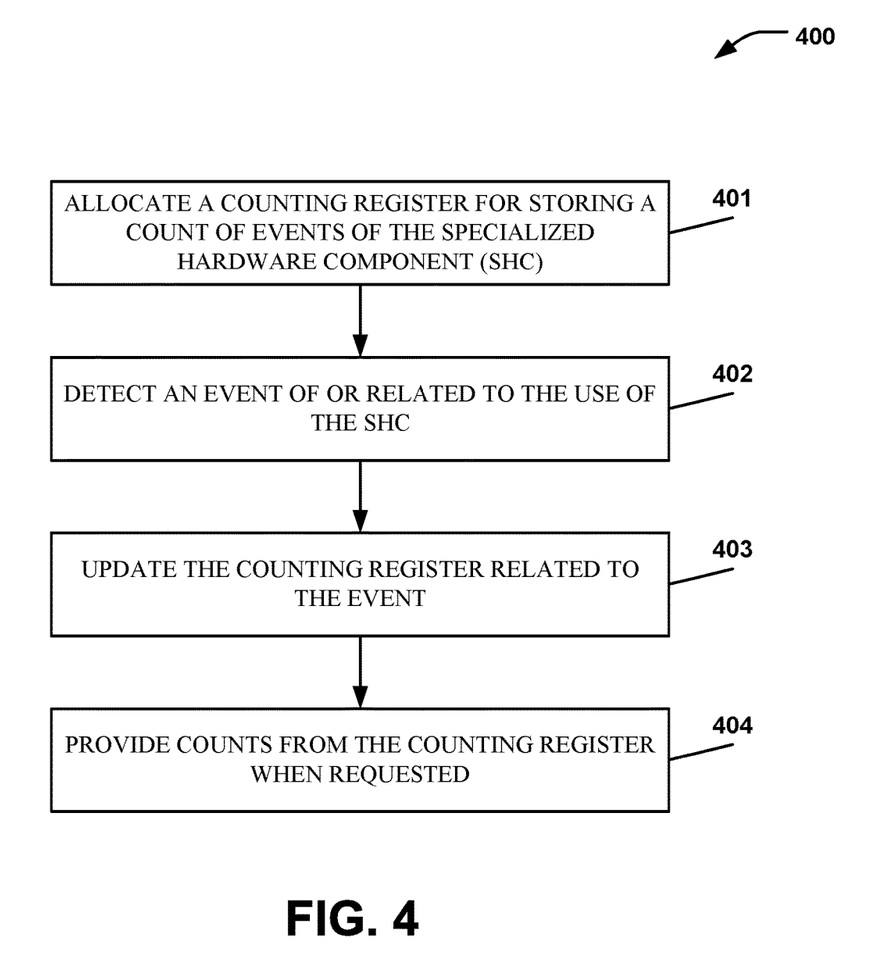
FIG. 4 is a flowchart illustrating a method for performing tracking of use of a specialized hardware component.

FIG. 4 is a flowchart 400 illustrating a method for performing tracking of use of a specialized hardware component. The method includes in a first step 401 allocating one or more counting registers for storing a count of events of or related to the SHC 105. The method also includes in a second step 402 detecting an event of or related to the use of the SHC 105. Detecting 402 may include determining a mode in which the SHC 105 operates. Additionally or alternatively, detecting 402 may include parsing which parts of the event match an application 201 operating on the SHC 105. Additionally or alternatively, detecting 402 may include parsing which parts of the event match one or more functions 215, 216 of the application 201. Additionally or alternatively, detecting 402 may include parsing which parts of the event match a particular bus such as communication bus of the general purpose processing block 203.

The method may also include updating at 403 the counting register related to the detected event. Updating the counting register may include determining whether a value of a characteristic of the particular event exceeds a threshold.

The method may also include providing at 404 counts from the one or more counting registers. This step 404 may include determining whether a request meets one or more authentication criteria. Further, this step 404 may include parsing the information in the one or more counting registers before aggregating and providing the counts to the requestor agent.

Figure 5:
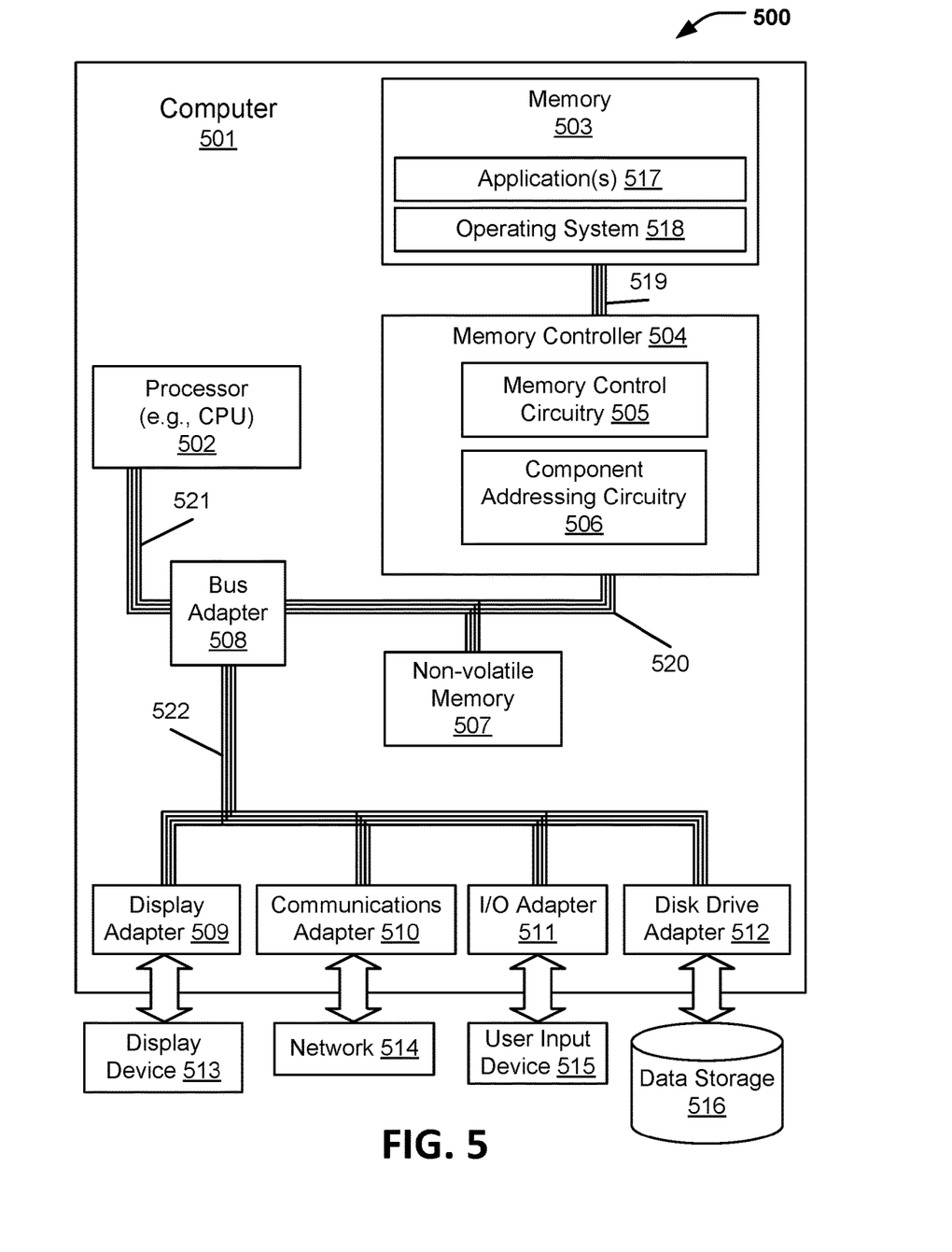
FIG. 5 is a block diagram showing a general computing system in which instructions may be performed for monitoring use of hardware components in a heterogeneous environment according to a particular embodiment.

Referring to FIG. 5, an illustrative system 500 including a computer 501 is shown. The computer 501 may be an implementation of a computing system that includes the device 103 of FIG. 1. The computer 501 includes at least one processor (e.g., CPU) 502 as well as a memory 503, a memory controller 504, and a non-volatile memory 507. At least one of the memory 503 and the non-volatile memory 507 may include an application such as application 201 of FIG. 2. In some implementations, the memory controller 504 may include one or more components of the coherence bus 214 of FIG. 2.

The memory 503 is connected through a memory bus 519 to the memory controller 504. The memory controller 504 and the non-volatile memory 507 are connected through a second memory bus 520 and a bus adapter 508 to the processor 502 through a processor bus 521. The memory controller 504 may include memory control circuitry 505 and component addressing circuitry 506. The memory control circuitry 505 and component addressing circuitry 506 facilitate interaction between various components in FIG. 5 including a component and the processor 502.

Stored in the memory 503 is one or more applications 517 that may be a module of user-level computer program instructions for carrying out one or more particular tasks (e.g., detecting an event related to use of the SHC, updating a counting register of a memory).

Also stored in the main memory 503 is an operating system 518. By way of example, an operating system may include a kernel and kernel-level computer program instructions for carry out particular tasks as known to those in the art. The operating system 518 and the applications 517 in the example of FIG. 5 are shown in the main memory 503, but components of the applications 517 and operating system 518 may also, or in addition, be stored in a non-volatile memory (e.g., on data storage, such as data storage 516 and/or the non-volatile memory 507).

The computer 501 includes a display adapter 509 that facilitates data communication between the bus adapter 508 and a display device 513, enabling the application 517 and/or the operating system 518 to present output on the display device 513 in a human viewable format.

In addition, the computer 501 includes a communications adapter 510 for data communications with a data communications network 450. The data communications may be carried out serially through Recommended Standard 509 (RS-232) connections (sometimes referred to as "serial" connections), through external buses such as a Universal Serial Bus ("USB"), through data communications networks such as internet protocol (IP) data communications networks, and in other ways as will occur to those of skill in the art. The communications adapter 510 implements the hardware level of data communications through which one computer sends data communications to another computer, directly or through a data communications network. Examples of the communications adapter 510 suitable to use in the computer 501 include, but are not limited to, modems for wired dial-up communications, Ethernet (Institute of Electrical and Electronics Engineers (IEEE) 802.3) adapters for wired network communications, and IEEE 802.11 adapters for wireless network communications.

The computer 501 also includes one or more input/output ("I/O") adapters 511 that implement user-oriented input/output through, for example, software drivers and computer hardware for controlling input and output to and from user input devices 515, such as keyboards and mice.

The computer 501 includes a disk drive adapter 512 coupled through an expansion bus 522 and the bus adapter 508 to the processor 502 and other components of the computer 501. The disk drive adapter 512 connects non-volatile data storage to the computer 501 in the form of the data storage 516 and may be implemented, for example, using Integrated Drive Electronics ("IDE") adapters, Small Computer System Interface ("SCSI") adapters, Serial Attached SCSI ("SAS") adapters, and others as will occur to those of skill in the art. Non-volatile computer memory also may be implemented as an optical disk drive, electrically erasable programmable read-only memory (so-called "EEPROM" or "Flash" memory), RAM drives, and other devices, as will occur to those of skill in the art. In a particular embodiment, the data storage 516 may store the data and information described herein.

Particular embodiments described herein may take the form of an entirely hardware embodiment, an entirely software embodiment, or an embodiment containing both hardware and software elements. In a particular embodiment, the disclosed methods are implemented in software that is embedded in processor readable storage medium and executed by a processor that includes but is not limited to firmware, resident software, microcode, et al.

Further, embodiments of the present disclosure, may take the form of a computer program product accessible from a computer-usable or computer-readable storage medium providing program code for use by or in connection with a computer or any instruction execution system. For the purposes of this description, a computer-usable or computer-readable storage medium may be any apparatus that may tangibly embody a computer program and that may contain, store, communicate, propagate, or transport the program for use by or in connection with the instruction execution system, apparatus, or device.

In various embodiments, the medium may include an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and digital versatile disk (DVD).

A data processing system suitable for storing and/or executing program code may include at least one processor coupled directly or indirectly to memory elements through a system bus. The memory elements may include local memory employed during actual execution of the program code, bulk storage, and cache memories that may provide temporary or more permanent storage of at least some program code in order to reduce the number of times code must be retrieved from bulk storage during execution.

Input/output or I/O devices (including but not limited to keyboards, displays, pointing devices) may be coupled to the data processing system either directly or through intervening I/O controllers or adapters. Network adapters may also be coupled to the data processing system to enable the data processing system to become coupled to other data processing systems or remote printers or storage devices through intervening private or public networks. Modems, cable modems, and Ethernet cards are just a few of the currently available types of network adapters.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and features as defined by the following claims.

What is claimed is:

1. An apparatus comprising:
   a central processing component (CPC) having a computing core;

a coherent memory bus coupled to the CPC;
a memory coupled to the coherent memory bus;
a communication bus coupled to the coherent memory bus;
a specialized hardware component (SHC) coupled to the communication bus; and
a SHC tracker coupled to the coherent memory bus, the SHC tracker configured to:
  allocate a counting register for storing a count of events of the SHC;
  detect an event of the SHC;
  update the counting register with a count related to the event of the SHC; and
  send counts from the counting register to another apparatus.

2. The apparatus of claim 1, wherein the event of the SHC includes a call to the SHC from an SHC processor proxy, wherein the call includes a message size, wherein the counting register includes an accumulator for tracking accumulated message size counts, and wherein updating the counting register includes updating the accumulator.

3. The apparatus of claim 2, wherein the event of the SHC includes a mode associated with operation of the SHC with respect to the SHC processor proxy, and wherein the SHC tracker is further configured to update the counting register only when the event of the SHC is associated with a first mode of a plurality of modes.

4. The apparatus of claim 2, wherein the SHC tracker is a programmed part of the SHC processor proxy.

5. The apparatus of claim 1, wherein the communication bus is a peripheral component interconnect express (PCIe) compliant bus and the SHC is coupled to the PCIe compliant bus.

6. The apparatus of claim 1, wherein the SHC tracker corresponds to instructions operating in the memory.

7. The apparatus of claim 1, wherein the SHC tracker is an on-chip part of the coherent memory bus.

8. The apparatus of claim 1, wherein the CPC includes a CPU having a plurality of cores for processing instructions.

9. The apparatus of claim 1, wherein the CPC includes a set of CPUs each having a plurality of cores for processing, in parallel, program instructions stored in the memory.

10. The apparatus of claim 1, wherein the SHC includes a set of functions, and wherein the SHC tracker is further configured to:
  allocate a function-counting register for a function of the SHC;
  determine whether the event of the SHC relates to the function of the SHC; and
  modify the function-counting register based on the determination.

11. A method for tracking use of a specialized hardware component (SHC) in a symmetric multiprocessing computing device, the method comprising:
  attaching a memory to a coherent memory bus;
  attaching a proxy to the coherent memory bus;
  attaching a communication bus to the proxy;
  attaching the SHC to the communication bus;
  attaching multi-core processors to the coherent memory bus;
  allocating in the memory a counting register for storing a count of events of the SHC;
  detecting an event of use of the SHC; and
  updating the counting register with a count related to the event of use of the SHC.

12. The method of claim 11, wherein the event of use of the SHC includes a mode associated with operation of the SHC with respect to the proxy, and wherein updating the counting register includes making an update only when the event of use of the SHC is associated with a first mode of a plurality of modes.

13. The method of claim 11, further comprising:
  listening for a request for information from the counting register, wherein the request is made by a device external to the symmetric multiprocessing computing device; and
  responding to the request by providing information from the counting register, wherein the proxy includes on-chip circuitry, and wherein the communication bus is a peripheral component interconnect express (PCIe) compliant bus.

14. The method of claim 11, wherein the SHC is programmed with a set of functions, wherein detecting the event of use of the SHC includes determining whether the event of use of the SHC relates to a function of the set of functions of the SHC, and wherein updating the counting register includes updating a count of calls to the function.

15. The method of claim 11, wherein the event of use of the SHC includes a call to the SHC, wherein the call includes a message size, wherein detecting the event of use of the SHC includes reading the message size, and wherein updating the counting register includes updating a message size count.

16. A computer-readable storage device comprising instructions executable by a processor to cause a symmetric multiprocessing computing device to:
  allocate a counting register for storing a count of software calls to a specialized hardware component (SHC) attached to a communication bus, wherein the communication bus is connected to the symmetric multiprocessing computing device;
  detect a software call to the SHC, the software call operating in a memory of the symmetric multiprocessing computing device;
  update the counting register with a count related to the software call to the SHC;
  listen for a request for information from the counting register, wherein the request is made by a device external to the symmetric multiprocessing computing device; and
  respond to the request by providing information from the counting register.

17. The computer-readable storage device of claim 16, wherein the SHC is operating according to a first mode of operation of a plurality of modes of operation with respect to a proxy operating in the memory, and wherein the updating only occurs when the SHC is operating according to the first mode.

18. The computer-readable storage device of claim 16, wherein the SHC is programmed with a set of functions, wherein detecting the software call includes detecting a call to a first function of the set of functions of the SHC, and wherein updating the counting register includes updating a function counter for the first function with a cumulative call to the first function.

19. The computer-readable storage device of claim 16, wherein the software call includes a message size, wherein detecting the software call includes determining the message size of the software call, and wherein updating the counting register includes updating a cumulative message size count.

20. The computer-readable storage device of claim 16, wherein the instructions further cause the symmetric multiprocessing computing device to:
  generate a trace event for each software call to the SHC;

send the trace event to a memory controller; and
record in a log file the trace event.

\* \* \* \* \*